United States Patent [19]

Konishi

[11] Patent Number: 4,534,429
[45] Date of Patent: Aug. 13, 1985

[54] COMBINATORIAL WEIGHING APPARATUS

[75] Inventor: Satoshi Konishi, Kusatsu, Japan

[73] Assignee: Kabushiki Kaisha Ishida Koki Seisakusho, Kyoto, Japan

[21] Appl. No.: 476,719

[22] Filed: Mar. 18, 1983

[30] Foreign Application Priority Data

Mar. 20, 1982 [JP] Japan .................................. 57-045282
Mar. 20, 1982 [JP] Japan ............................ 57-39628[U]
Mar. 20, 1982 [JP] Japan ............................ 57-39629[U]
Mar. 20, 1982 [JP] Japan ............................ 57-39630[U]

[51] Int. Cl.³ ..................... G01G 19/22; G01G 19/52; G01G 13/22
[52] U.S. Cl. ........................................ 177/25; 177/50; 177/98
[58] Field of Search ............................. 177/25, 50, 98; 209/596

[56] References Cited

U.S. PATENT DOCUMENTS 4,398,612  8/1983  Mikami et al. ........................ 177/25
4,421,185 12/1983  Koto et al. ............................. 177/25
4,431,070  2/1984  Andrews ............................ 209/596

Primary Examiner—George H. Miller, Jr.
Attorney, Agent, or Firm—Staas & Halsey

[57] ABSTRACT

A combinatorial weighing apparatus for weighing out articles includes a base having a top surface which is quadrangular in shape, and a plurality of weighing hoppers mounted on the base, side by side, horizontally along a substantially straight line. Mounted on the base are weighing mechanisms for measuring the weights of articles introduced in corresponding weighing hoppers, and a hopper drive mechanism for obtaining a combination of the articles giving a total weight closest to a target weight and for actuating prescribed ones of the weighing hoppers. A chute for receiving articles discharged from each of the weighing hoppers, and a collecting hopper for collecting the articles from the chute are also mounted on the base. The weighing hoppers, chute and collecting hopper are disposed on the front side of the base. The combinatorial weighing apparatus is ideal for use in combination with others of the same construction.

2 Claims, 13 Drawing Figures

COMBINATORIAL WEIGHING APPARATUS

BACKGROUND OF THE INVENTION

This invention relates to a combinatorial weighing apparatus capable of combining and weighing out articles.

A combinatorial weighing apparatus known in the art operates by measuring the weights of articles loaded into a plurality of weighing hoppers, selecting a combination of the articles giving a total weight closest to a target weight value, discharging only the selected articles from the weighing hoppers, subsequently reloading articles into the weighing hoppers whose articles have been discharged, to prepare for the next weighing cycle, and then repeating the foregoing steps so that an automatic weighing operation may proceed in continuous fashion.

The combinatorial weighing apparatus of the foregoing type has a charging hopper disposed on the central portion of a base, the base having an upper surface which is circular in shape, and a distributing supply device extending radially from the center of the base, provided at the lower end of the charging hopper, for transferring articles, discharged from an outlet port located at the lower end of the charging hopper in order to weigh the articles. A plurality of weighing stations are provided on the circumference of the circularly formed base, each weighing station including a weighing hopper and a weighing device for measuring the weight of the articles introduced into the weighing hopper from the distributing supply device. After the weights of the articles introduced into the weighing hoppers of the respective weighing stations are measured, the apparatus finds a combination of articles having a weight closest to a preset target weight by performing computations based on the measurements obtained, opens the weighing hoppers corresponding to said combination and collects the articles discharged from these weighing hoppers in a container disposed below a chute, the upper end of the chute receiving the articles directly from the weighing hoppers.

With the combinatorial weighing apparatus having the conventional construction described above, the circular configuration of the base necessitates not only a large installation area but also considerable space about the entire circumference of the apparatus for inspecting the weighing stations which, as set forth above, are arrayed on the circumference of the base. Another disadvantage is that it is impossible to combine a plurality of these combinatorial weighing apparatuses so as to, say, have each apparatus weigh out articles of a kind different from those being weighed out by the others and package the resulting articles in a single pack.

Another problem with the conventional combinatorial weighing apparatus is that, as the weighing operation proceeds, the articles supplied do not always flow in an orderly manner or may be introduced into the weighing hoppers in an amount which is more than that expected. In either case the result can be an unsatisfactory weighing operation, such as weighing out more of the articles than intended. In one arrangement of the conventional apparatus, therefore, articles which have been weighed improperly are discharged into a packaging container which is then removed from the apparatus. This means that the operator must go to the combinatorial weighing apparatus to remove an improperly weighed batch of articles whenever an abnormal weighing operation occurs, and that normal weighing cannot proceed until the container is removed. The overall result is a decline in the efficiency of the weighing operation.

Still another shortcoming encountered in the prior-art combinatorial weighing apparatus, specifically in the distributing supply device thereof, is a variation in the flow rate of the articles as they travel along the troughs of the distributing supply device in the process of being supplied to the weighing stations. When weighing is performed under such condition, a frequent occurrence is an improper weighing operation or one in which more articles are weighed out than intended. Again, the result is poor weighing efficiency.

A further disadvantage possessed by the conventional apparatus is that since the weighing stations are disposed on the circumference of the base, a hopper drive mechanism for driving a weighing hopper and associated pool hopper must be provided for each of the plurality of weighing stations.

SUMMARY OF THE INVENTION

Accordingly, an object of the present invention is to provide a combinatorial weighing apparatus which requires only a small installation area and a small area for maintenance, but for which maintenance can be performed with facility.

Another object of the present invention is to provide a combinatorial weighing apparatus so that a plurality of combinatorial weighing apparatuses can be used in combination to permit the combinatorial weighing of various kinds of articles, and wherein the overall space factor is improved while providing ease of maintenance.

Still another object of the present invention is to provide a combinatorial weighing apparatus in which, in the event of an abnormal weighing operation, weighing can continue following exclusion of an article batch having a improper weight.

Yet another object of the present invention is to provide an article distributing supply device in a combinatorial weighing apparatus, adapted to avoid pronounced non-uniformity in the quantity of articles supplied to each of a plurality of weighing hoppers.

A further object of the present invention is to provide a hopper drive mechanism in a combinatorial weighing apparatus, adapted so that each of a plurality of pool hoppers and weighing hoppers can be driven by a single driving source.

According to the present invention, these and other objects are attained by providing an apparatus for combining and weighing out articles which includes a base the top surface which is quadrangular in shape, and a plurality of weighing hoppers provided on the base, side by side, horizontally along a substantially straight line. Also provided on the base are weighing mechanisms for measuring the weights of articles introduced in corresponding weighing hoppers, a hopper drive mechanism for obtaining a combination of the articles giving a total weight closest to a target weight and for actuating prescribed ones of the weighing hoppers, a chute for receiving articles discharged from each of the weighing hoppers, and a collecting hopper provided for collecting the articles from the chute. Of the above-mentioned elements, at least the weighing hoppers, chute and collecting hopper are disposed on the front side of the base. The weighing apparatus is ideal for use in combination with others of the same construction, making it possible to weigh out different kinds of articles using respective ones of the weighing apparatus set-ups and to package the mixture of articles in a single pack. The weighing apparatus of the present invention deals with improper weighing operations immediately in automatic fashion and features a simplified and improved article supply device and hopper drive mechanism.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
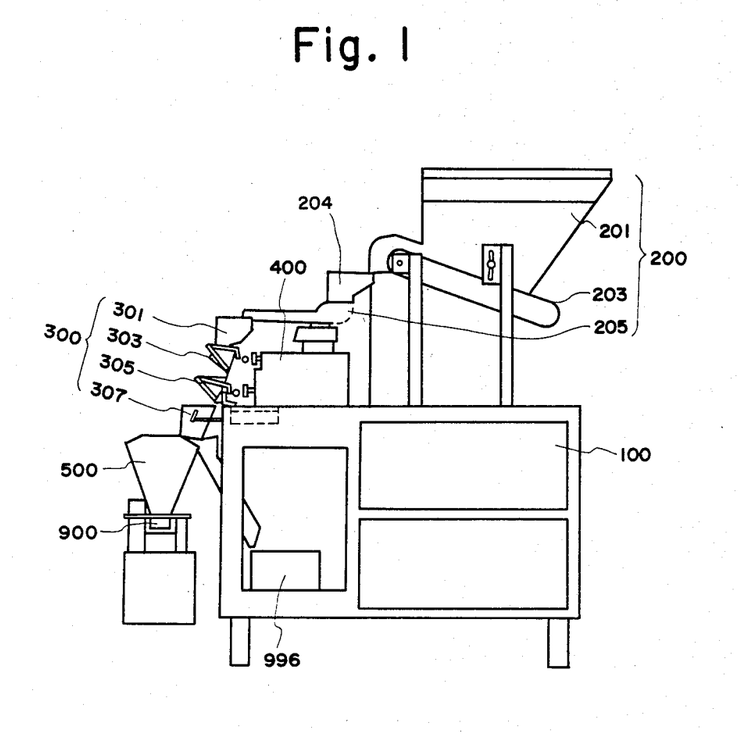
FIG. 1 is a side elevation view illustrating an embodiment of a combinatorial weighing apparatus according to the present invention.

As illustrated in FIG. 1, a combinatorial weighing apparatus according to the present invention includes a supply station 200 disposed on the top part of a base 100. The supply station 200 comprises a charging hopper 201, a supply belt 203 and a vibratory feeder 205. The top surface of the base 100 is quadrangular or, more preferably, rectangular in shape. A weighing station 300, which comprises plural feed chutes 301, plural pool hoppers 303, plural weighing hoppers 305 (The feed chutes 301 and, similarly, the pool hoppers 303 and weighing hoppers 305, are arranged in side-by-side relation, as will be apparent from FIG. 4) and a feeder 307, is provided on the left side of the base 100 as viewed in FIG. 1 (The left side of the apparatus as viewed in FIG. 1 actually constituting the front side when in use.) A hopper drive mechanism 400 is also provided on the top part of the base 100 and includes a separately installed arithmetic unit (not shown) which performs computations based on measurements taken of articles charged into each of the weighing hoppers 305, to obtain a combination of articles giving a total weight closest to a preset target weight. The arrangement of the hopper drive mechanism is such that selected weighing hoppers 305 will open according to the results of the above-mentioned computations. Numeral 500 denotes a collecting hopper, 900 a container and 996 a basket, all of which will be described in further detail later.

Figure 2:
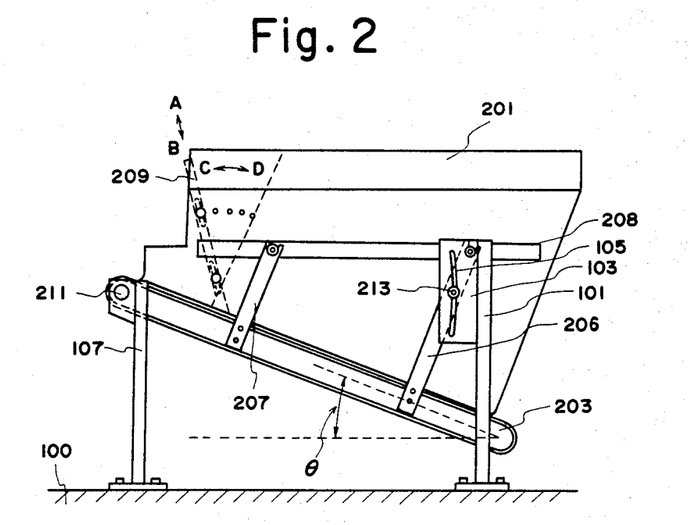
FIG. 2 is a side elevation view showing of a supply station in the combinatorial weighing apparatus of FIG. 1.

In the supply station 200, best shown in FIG. 2, the charging hopper 201 and supply belt 203 are structurally integrated by beams 206, 207, 208. Provided within the charging hopper 201 is a partitioning plate 209 movable in the directions of arrows A and B and pivotable in the directions of arrows C and D for adjusting the area of an opening through which the articles that are to be weighed pass. A pivot shaft 211 is provided at one end of the supply belt 203 and is pivotally secured to a column 107 erected on the top surface of the base 100. Thus the supply belt 203 is attached to the base 100 via the pivot shaft 211 and column 107 and is capable of being pivoted slightly with the pivot shaft 211 as the fulcrum. Also erected on the top surface of the base 100 is a column 101 having an adjusting plate 103 affixed to the distal end thereof. The adjusting plate 103 is formed to include a curved slit 105, the center of the arc of the curve being the pivot shaft 211. A bolt 213, affixed at one end to the beam 206, has its other end fit into the slit 105, and a nut (not shown) is screwed onto said other end of the bolt 213 to fasten the beam 206 to the adjusting plate 103 so that the supply belt 203 and, hence, the charging hopper 201, will be secured against movement relative to the base 100. Loosening the above-mentioned nut, however, will permit pivotal movement about the fulcrum 211, as will be described in further detail later.

Figures 3A, 3B:
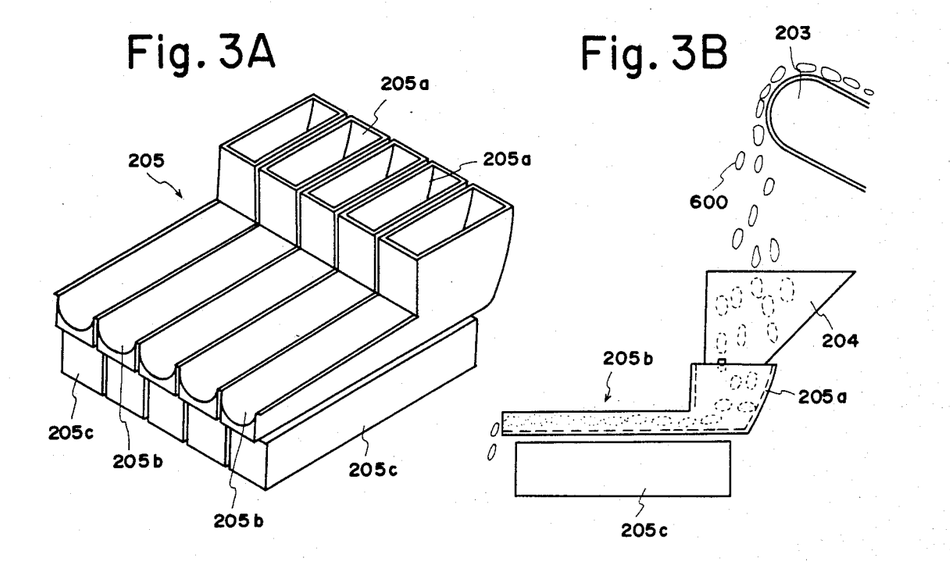
FIGS. 3A and 3B are a prespective view and side elevation view, respectively, illustrating a vibratory feeder in the combinatorial weighing apparatus of FIG. 1.

As shown in FIG. 3A, the vibratory feeder 205 in the illustrated embodiment comprises five hoppers 205a, five troughs 205b and five vibrators 205c. The vibrators 205c are adapted to vibrate corresponding ones of the troughs 205b independently of one another, as depicted in FIG. 3B. Articles 600 which fall into the hoppers 205a from the supply belt 203 via a chute 204 are vibrated by the hoppers. The articles are thereby transferred gradually along the troughs 205b until they drop from the forward ends of the troughs 205b.

Figure 4:
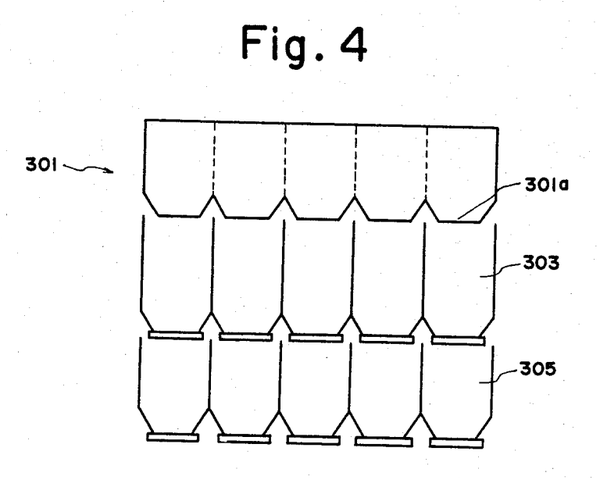
FIG. 4 is a front elevation view illustrating an arrangement of feed chutes, pool hoppers and weighing hoppers in the combinatorial weighing apparatus of FIG. 1.
Figure 5:
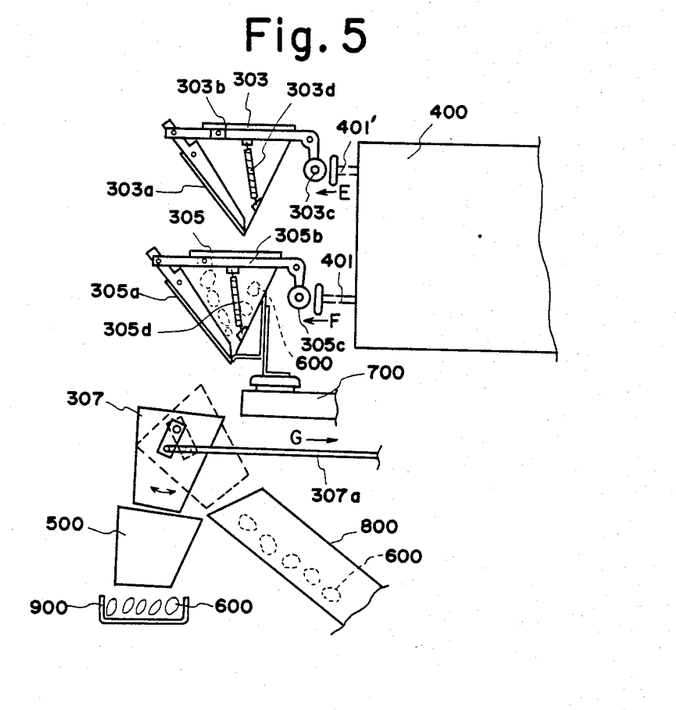
FIG. 5 is a side elevation view illustrating a weighing station in the combinatorial weighing apparatus of FIG. 1.
Figure 6:
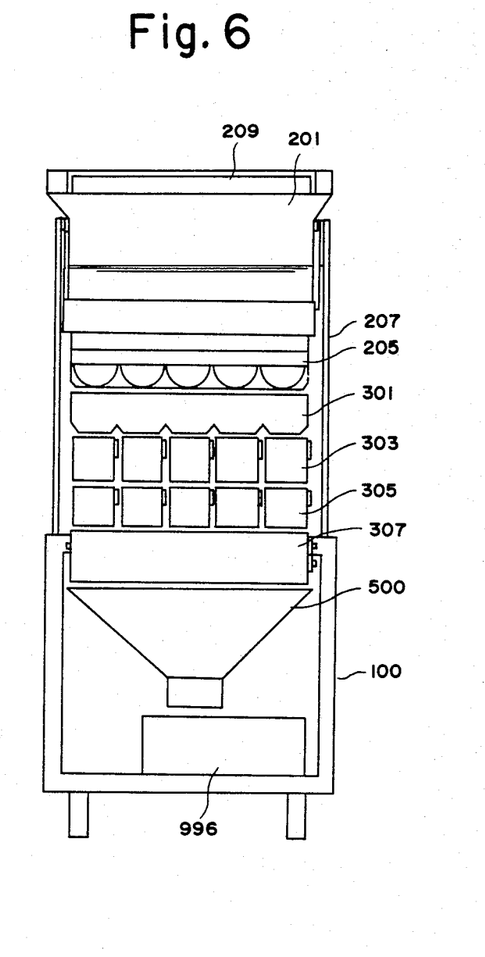
FIG. 6 is a front elevation view of the combinatorial weighing apparatus according to the present invention.

As shown in FIG. 4, the five feed chutes 301 of the weighing station 300 have respective discharge ports 301a arranged along a straight line, for forming the flow of articles 600 received from the overlying vibratory feeder 205 into five streams and to guide the articles into the pool hoppers 303, of which five are provided, underlying the discharge ports 301a in a side-by-side arrangement. Likewise, the weighing hoppers 305, which are five in number, are arranged side by side and underly the pool hoppers 303. These rows of pool hoppers 303 and weighing hoppers 305 are disposed on the front side of the apparatus and extend substantially linearly in the horizontal direction. As shown in FIG. 5, each pool hopper 303 is provided with a pivotally attached hatch 303a at the lower part thereof. The hatch 303a normally is held closed under a pulling force applied by a tension spring 303d but is designed to be opened by a link mechanism 303b which is caused to flex when a roller 303c, provided at the distal end of the link mechanism, is pushed in the direction of arrow E by a rod 401' in a manner described later. The weighing hoppers 305 have a construction similar to that of the pool hoppers 303. Thus, each weighing hopper 305 is provided with a pivotally attached hatch 305a at the lower part thereof. The hatch 305a normally is held closed under a pulling force applied by a tension spring 305d but is designed to be opened by a link mechanism 305b which is caused to flex when a roller 305c, provided at the distal end of the link mechanism, is pushed in the direction of arrow F by a rod 401, as will be described below. Underlying each of the weighing hoppers 305 is a weighing mechanism 700 having a weight sensor on which the corresponding weighing hopper 305 is mounted. Articles 600 introduced in the weighing hoppers 305 thus are weighed by the associated weighing mechanisms 700. The chute 307, shown in FIGS. 1, 5 and 6, is disposed on the front side of the apparatus at the lower part thereof and serves to both guide and collect the weighed articles 600 which fall from whichever of the weighing hoppers 305 discharge their articles. As illustrated in FIG. 5, the chute 307 is pivotally secured to the base 100 so as to be tiltable in the direction of the arrows. Normally the chute 307 is in the attitude indicated by the solid lines in FIG. 5 to guide the flow of weighed articles 600, received from the weighing hoppers 305, into the collecting hopper 500. In the event of an unsatisfactory weighing operation, such as the weighing out of an excess of articles, a rod 307a, one end of which is connected to the chute 307, is pulled in the direction of arrow G to tilt the chute 307 into the attitude indicated by the dashed lines, whereby the weighed articles 600 directed into a discharge guide member 800.

Figure 9:
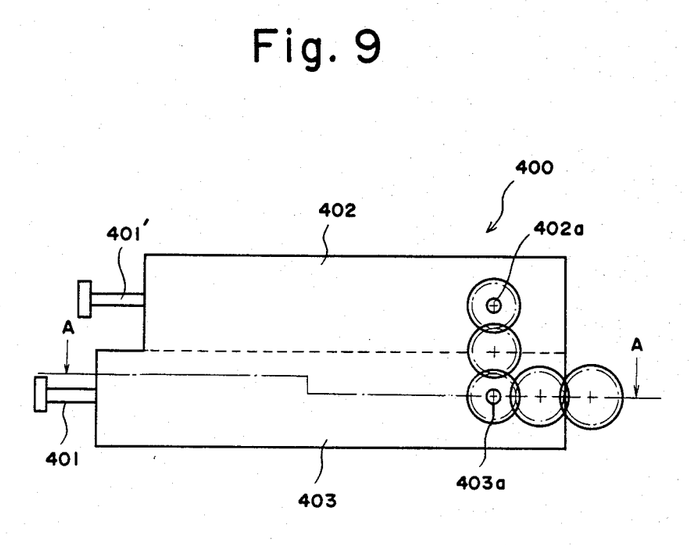
FIG. 9 is a side elevation view illustrating a hopper drive mechanism in the combinatorial weighing apparatus of the present invention.
Figure 10:
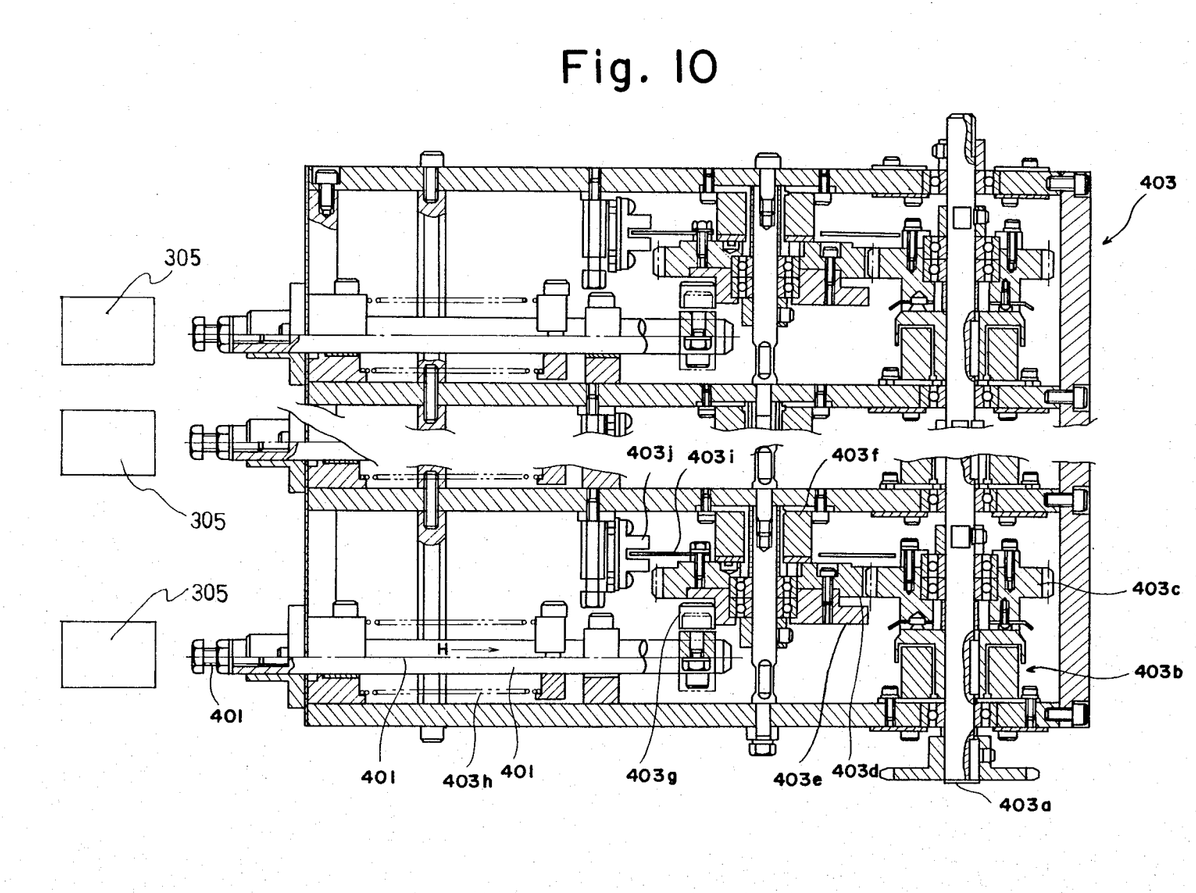
FIG. 10 is a fragmentary sectional view taken along line A—A of FIG. 9.

As illustrated in FIG. 9, the hopper drive mechanism 400 is divided into upper and lower sections. The upper section is a pool hopper drive unit 402 for actuating the pool hoppers 303, and the lower section is a weighing hopper drive unit 403 for actuating the weighing hoppers 305. The drive units 402 and 403 are equipped with respective drive shafts 402a and 403a driven rotatively through gears by means of motors, not shown. Referring to the sectional view of FIG. 10, taken along the line A—A of FIG. 9, the weighing hopper drive unit 403 is shown to include a clutch 403b and a gear 403c that is arranged to rotate on the drive shaft 403a. The gear 403c will be driven into rotation by a rotating force received from the drive shaft 403a when the clutch 403b is engaged. The weighing hopper drive unit 403 also includes a gear 403d provided with a cam 403e, a brake 403f for stopping rotation of the gear 403d, a cam follower 403g for following the cam 403e, and a compression spring 403h for pushing the rod 401 in the direction of the arrow H shown in FIG. 10 and for bringing the cam follower 403g into contact with the cam 403e. Also provided are a slit cam 403i, a portion which is formed to include a slit, and a photocoupler 403j for sensing the rotational orientation of the slit cam 403i. It should be noted that, in the illustrated preferred embodiment of the invention, five of the rods 401 are provided for driving the hatches 305a on corresponding weighing hoppers 305 (FIG. 5), so that five sets of the foregoing arrangement for actuating corresponding ones of the rods 401 are provided along the drive shaft 403a. It should also be noted that the pool hopper drive unit 402, with rods 401' for driving the hatches 303a of the pool hoppers 303, has exactly the same construction and operation as the weighing hopper drive unit 403, and therefore will not be described.

At the start of operation of the combinatorial weighing apparatus according to the present invention, the nut (not shown) fastening the supply belt 203 to the adjusting plate 103 via the beam 206 and screw 213 is loosened so that the angle of inclination $\theta$ of the supply belt 203, having the charging hopper 201 coupled thereto, may be set in accordance with the type of article 600 to be weighed. The angle $\theta$ should be set just large enough so that an article placed on the supply belt will tend to slide or roll along the incline. The partitioning plate 209 is also adjusted in the directions of arrows A, B, C and D to set its inclination and the opening area defined thereby in accordance with the article type. Next, the articles 600 that are to be weighed are introduced into the charging hopper 201 followed by setting the supply belt 203 into operation, whereby the articles 600 are conveyed up the incline toward the upper end of the supply belt 203 through the opening defined in the charging hopper 201 by the partitioning plate 209. If the angle of inclination of the supply belt 203 has been suitably set, then the articles 600 will form a layer of substantially uniform thickness by the time they reach the upper end of the supply belt 203 and assume a uniform distribution per unit area near the end of the supply belt 203 before they drop through the chute 204 into the hopper 205a of the vibratory feeder 205. The articles 600 drop through the chute 204 into the hoppers 205a of the vibratory feeder 205 so that the flow of articles is divided into five portions. The oscillations set up by the vibrator 205c, cause the articles 600 to migrate along the troughs 205b and to drop into the underlying feed chutes 301. If an excess number of the articles 600 should be charged into the chute 204, this will be detected by a level detector (not shown) provided on the chute 204 for temporarily suspending rotation of the supply belt 203 and, hence, the delivery of the articles. From the feed chutes 301 the articles 600 are introduced steadily into the underlying pool hoppers 303 (all of which are empty at the start of operation) where the articles are retained temporarily. Next, with operation of the hopper drive mechanism 400, the rods 401' are pressed against the corresponding rollers 303c, opening the hatches 303a of the corresponding pool hoppers 303 to release a suitable quantity of the articles into each of the underlying weighing hoppers 305, which are empty at the start of operation. The quantity of articles introduced into each weighing hopper need not be uniform. This is followed by further actuation of the vibratory feeder 205 to supply the pool hoppers 303 with suitable amounts of the articles 600. The vibratory feeder 205 is then turned off and, when all oscillation has ceased, the weighing mechanisms 700 are actuated to weigh the articles 600 received in each of the weighing hoppers 305. Then, using the weights of the articles in each of the weighing hoppers 305 measured by the weighing mechanisms 700, the arithmetic unit (not shown), which is part of the hopper drive mechanism 400 and which comprises a computer installed in the base 100, performs combinatorial computations to obtain a combination of the weight values giving a total weight closest to a preset target weight.

Based on the result of these computations, selected clutches 403b in the weighing hopper drive unit 403 are engaged and the brakes 403f disengaged, whereupon the gears 403c and 403d begin rotating. As a result, the cams 403e associated with the gears 403d push the respective rods 401 outwardly of the drive unit to open the hatches 305a of the corresponding weighing hoppers 305, and the articles 600 contained therein are released into the chute 307. The articles fall through the chute 307 and the collecting hopper 500 and accumulate in the underlying container 900. The articles 600 cast into the container 900 in this manner will have a total weight closest to the preset target weight. As the cams 403e continue to turn, the associated rods 401 are retracted under the force applied by the compression springs 403h to close the hatches 305a of the corresponding weighing hoppers 305. With further rotation of the gears 403d, the photocouplers 403j detect the slit in the corresponding slit cams 403i, upon which the associated brakes 403f are engaged and the clutches 403b disengaged to stop the corresponding gears 403c. Thereafter, the weighing hoppers 305 which are empty are supplied with articles 600 from the pool hoppers 303, which are themselves provided with a further supply of the articles. The pool hopper drive unit 402 for actuating the hatches 303a of the pool hoppers 303 operates in entirely the same manner as the weighing hopper drive unit 403.

The foregoing sequence constitutes a single weighing cycle, which is followed by second, third and subsequent cycles performed in the same fashion. If an abnormal weighing operation should occur during the weighing out of articles performed by the weighing hoppers 305, the rod 307a connected to the chute 307 is moved in the direction of the arrow G in FIG. 5 to tilt the chute 307 to the position indicated by the dotted line and the hatches 305a of the weighing hoppers 305 are opened so that the articles 600 contained therein will be cast into the discharge guide 800 and introduced thereby into a basket 996 for retrieval when necessary, rather than being cast into the container 900, thereby preventing the delivery of articles of an unsatisfactory weight.

The above-described combinatorial weighing apparatus of the present invention can be used singly or in combination with two or more of the same. Such an arrangement will now be described with reference to FIG. 7.

Figure 7:
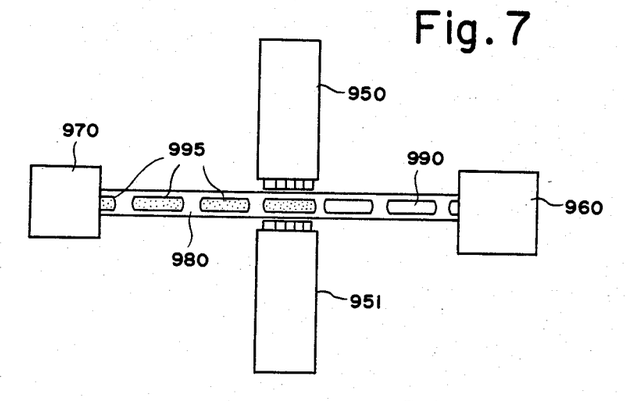
FIG. 7 and FIGS. 8A through 8C are top views illustrating a plurality of combinatorial weighing apparatuses when in used in combination.

In FIG. 7, numerals 950 and 951 denote combinatorial weighing apparatuses in accordance with the present invention, arranged so that their front sides face each other across a conveyor belt 980 extending between a container supply device 960 and packaging machine 970. The container supply device 960 is adapted to place empty containers 990 on the belt conveyor 980 which proceeds to carry the containers to the location between the front sides of the combinatorial weighing apparatuses 950 and 951. The container 990 which has arrived at this location is supplied with, for example, toffees of a prescribed weight dispensed by the combinatorial weighing apparatus 950, and with, for example, chocolate balls of a prescribed weight dispensed by the combinatorial weighing apparatus 951. Containers 995 thus filled with these articles are then carried by the belt conveyor 980 to the packaging machine 970 where they are packed.

Figure 8A:
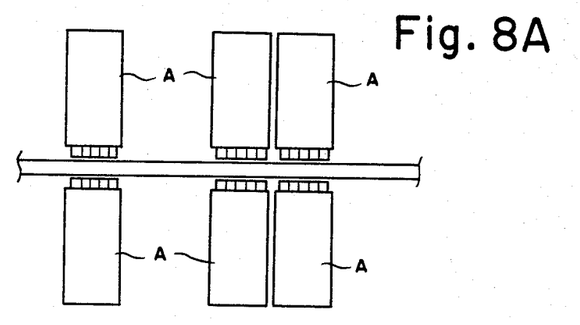
Figures 8B, 8C:
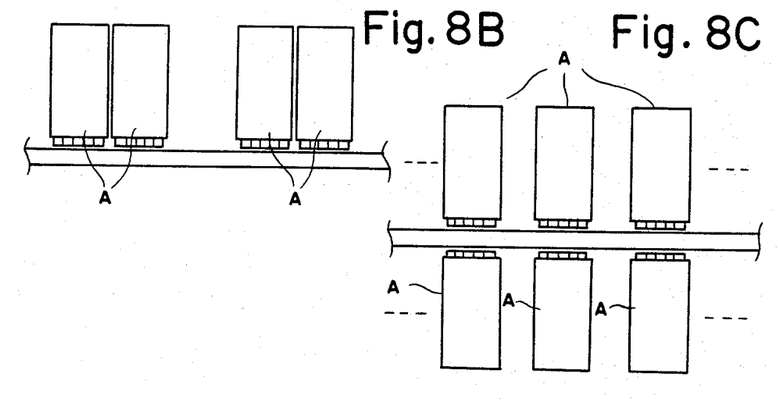

It should be noted that the combinatorial weighing apparatus of the invention is not limited to the arrangment shown in FIG. 7. Other arrangements which are feasible are as illustrated in FIGS. 8A, 8B and 8C, in which A denotes the combinatorial weighing apparatus.

In accordance with the present invention as illustrated and described above, the combinatorial weighing apparatus includes a plurality of weighing hoppers 305 provided closely side by side in a substantially linear, horizontal array, and a chute 307 for receiving the articles released by weighing hoppers. The weighing hoppers 305 and chute 307 are disposed on the front side of the apparatus, and the base 100 for supporting the supply station 200 and weighing station 300 is quadrangular in shape. The apparatus therefore requires much less area for installation than the conventional circular apparatus, so that factory floor space can be exploited more efficiently. In addition, since the weighing hoppers 305, chute 307 and collecting hopper 500 are disposed on the front side of the weighing apparatus, almost all points requiring inspection by the operator are located at the front of the apparatus, meaning that less area is needed for such inspection. Furthermore, the fact that the base is rectangular in shape permits a plurality of the combinatorial weighing apparatuses to be arranged in a row and used in combination, making possible operations which were not feasible with the prior art, such as combinatorially weighing out articles of many kinds.

According to another feature of the present invention, the chute 307 disposed beneath the weighing hoppers 305 is arranged to be tiltable so that a combination of batches of articles resulting from an abnormal weighing operation can be discharged into an area other than the collecting hopper 500 merely by tilting the chute 307. The chute 307 will lead the falling articles into the collecting hopper 500 when conditions are normal, but can be tilted by the pulling action of the rod 307a in the event of an unsatisfactory weighing operation to automatically lead the articles into the discharge guide 800. Unlike the prior art, where the operator is compelled to suspend the combinatorial weighing operation and remove a combination of batches of articles resulting from an unsatisfactory weighing cycle each time such a cycle occurs, the present invention permits operation to continue and does not require frequent removal of the articles involved in the faulty weighing cycle. The end result is vastly improved weighing efficiency. Note that a completely unmanned weighing system is feasible owing to the automatic exclusion of the articles that have been weighed out unsatisfactorily.

Furthermore, the fact that the substantially linear array of weighing hoppers 305 and the chute 307 for receiving the articles from them are disposed on the front side of the weighing apparatus, namely on one side of the base 100, means that the belt 203 for supplying the weighing hoppers 305 with the articles need only have a flat configuration capable of conveying the articles in one direction, i.e., toward the front side of the apparatus. This permits use of the simply constructed charging hopper 201 which need only be capable of dropping articles from above a single location, whereas the prior art requires charging hoppers extending radially outward from the center of the apparatus. The combinatorial weighing apparatus of the invention also permits adjustment of the angle of inclination of the charging hopper as well as regulation of the opening area near the charging hopper outlet. In accordance with the type of article, therefore, the angle of inclination can be made slightly larger than that at which the articles would be at rest, and the opening area can be regulated according to the article diameter, thereby forming a substantially uniform bed of the articles by the time they reach the end of the supply belt 203. Since the articles will therefore have a substantially uniform distribution per unit area near the end of the supply belt, they will fall onto the vibratory feeder 205 at a uniform rate.

Another advantage afforded by grouping the plurality of weighing hoppers 305 together at the front of the apparatus is that the hopper drive mechanism 400 is capable of actuating all of the rods 401, for opening the hatches 305a of corresponding weighing hoppers, by means of the single drive shaft 403a. This enables use of a driving source simpler than that employed in the prior-art apparatus. Also, a simple cam mechanism suffices for the transmission of force from the drive shaft to the rods 401. The structural features provide a combinatorial weighing apparatus which is simple and easy to assemble and low in cost.

As many apparently widely different embodiments of the present invention can be made without departing from the spirit and scope thereof, it is to be understood that the invention is not limited to the specific embodiments thereof except as defined in the appended claims.

I claim:

1. A combinatorial weighing apparatus, comprising
a base;
a plurality of hoppers mounted on said base;
supply means, for supplying articles to the hoppers, including
   a supply belt, mounted on the base, the supply belt having an angle of inclination with respect to the base;
   a charging hopper, mounted on the base, the charging hopper having an outlet port located above the supply belt;
   an angle adjusting mechanism connected to the charging hopper and the supply belt; and
   a partitioning plate mounted on the charging hopper; and
weighing means, mounted on the base, for weighing batches of articles in the hoppers, selecting a combination of batches of articles having a total weight closest to a target weight, discharging the selected combination of batches of articles from the hoppers, and collecting the batches of articles discharged from the hoppers.

2. A combinatorial weighing apparatus according to claim 1, wherein
said outlet port is located above the supply belt and defines an opening between the outlet port and the supply belt, further comprising
means, connected to the charging hopper and the supply belt, for varying the angle of inclination of the supply belt; and
means, connected to the charging hopper, for varying the size of the opening between the outlet port and the supply belt.

* * * * *